US010319129B2

(12) United States Patent
Dhanuka et al.

(10) Patent No.: US 10,319,129 B2
(45) Date of Patent: Jun. 11, 2019

(54) SNAPPING LINE GENERATION

(71) Applicant: Adobe Inc., San Jose, CA (US)

(72) Inventors: Praveen Kumar Dhanuka, Howrah (IN); Neeraj Nandkeolyar, Ghaziabad (IN); Chirag Maheshwari, Nodia (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/418,319

(22) Filed: Jan. 27, 2017

(65) Prior Publication Data

US 2018/0218523 A1  Aug. 2, 2018

(51) Int. Cl.
*G06T 11/60* (2006.01)
*G06F 17/21* (2006.01)
*G06T 3/40* (2006.01)
*G06F 3/0482* (2013.01)

(52) U.S. Cl.
CPC ............ *G06T 11/60* (2013.01); *G06F 17/214* (2013.01); *G06T 3/403* (2013.01); *G06F 3/0482* (2013.01); *G06F 2203/04806* (2013.01); *G06T 2200/24* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 2010/0174977 A1* | 7/2010 | Mansfield | G06F 17/211 715/234 |
| 2014/0359433 A1* | 12/2014 | Zyl | G06F 3/04883 715/256 |
| 2016/0034438 A1* | 2/2016 | Yalovsky | G06F 17/211 715/780 |

* cited by examiner

*Primary Examiner* — Diane M Wills
(74) *Attorney, Agent, or Firm* — SBMC

(57) ABSTRACT

Techniques and systems are described for snapping line generation based on glyphs. Techniques include locating bounding box lines from bounding boxes of glyphs. The bounding box lines may then be analyzed to identify which of the bounding box lines are collinear and at least one snapping line is generated based on the collinearity of the bounding box lines. The generated snapping lines are then output in a user interface to facilitate snapping objects to the snapping line.

20 Claims, 7 Drawing Sheets

SNAPPING LINE GENERATION

BACKGROUND

Oftentimes, users desire to combine text characters with digital objects in a visually cohesive way as part of creating digital content. For example, a user may wish to add a logo next to text within a digital image. To do so, the user may interact with a user interface to add and size the logo with the text such that a size of the text and the logo appear consistent with each other. However, conventional techniques used to achieve this typically require specialized knowledge on the part of the user, are inaccurate, are time consuming, and limit an ability of the user to further modify the text and/or logo.

In one such conventional example, snapping lines are generated and displayed in a user interface by a computing device based on dimensions of a text box that contains the text. However, this often results in inaccuracies and lacks visual cohesiveness. This is because the size of the text box does not conform to the size of individual characters of text within the box that are actually viewed in the user interface. Additionally, this conventional technique does not provide snapping lines between top and bottom edges or left and right edges of the text box. Thus, a user is unable to interact with the computing device to snap the digital object to visual properties of the text characters such as a height of lower-case text characters in the text box.

In another such conventional example, a user may manually create guide lines around a text object through interaction with a user interface. This technique requires a user to manually draw guide lines in the user interface around visual properties of the text characters and then snap the digital object to the guide lines. However, because this technique involves manual interaction with the user interface, it may be complex, time consuming, and inaccurate. Additionally, because the guide lines are independent from the text characters, the guide lines must be recreated by additional manual interaction with the user interface whenever the text characters are modified. Modifications to text characters may include moving a text box, removing text characters from a text box, adding text characters to a text box, or changing a font style or language of the text characters.

SUMMARY

Techniques and systems for snapping line generation are described. In one example, techniques are implemented using a computing device for generating snapping lines around glyphs, e.g., text characters. The computing device may utilize techniques for locating a plurality of bounding box lines from edges of a plurality of glyph bounding boxes, with each glyph bounding box corresponding to a glyph for output in a user interface. The computing device may then utilize techniques for identifying collinear bounding box lines as a candidate snapping line, and then generate a snapping line based on the identified collinearity. Then, the computing device outputs the generated snapping line in the user interface. All this may be performed automatically and without user intervention. The generated snapping line is operable to cause an edge of a digital object to move to the snapping line, or "magnetically" attach, in response to a user input to move the edge into proximity of the snapping line in the user interface. In this way, a user may snap a digital object to snapping lines that are generated based on characteristics of glyphs. Alternatively, or additionally, the computing device may utilize techniques for identifying a candidate snapping line defining an edge of a plurality of consecutive glyph bounding boxes. From this, the snapping line is generated based on the identified candidate snapping line. As a result, the computing device may generate a snapping line based on visual properties of the glyphs.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
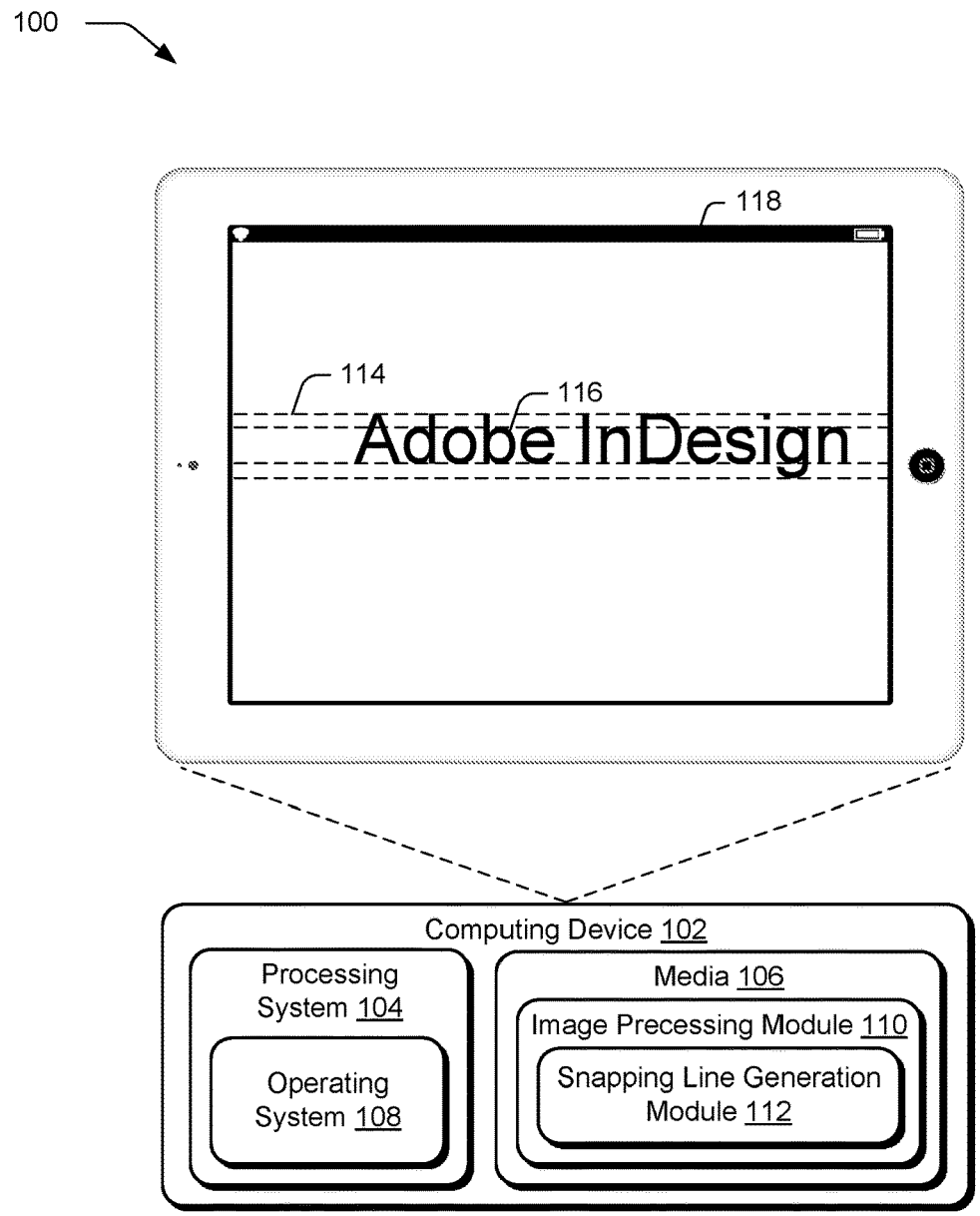
FIG. 1 is an illustration of a system in an example implementation that is operable to employ techniques for snapping line generation as described herein.

Conventional techniques for combining glyphs and digital objects in a visually cohesive way rely on manual user inputs to align and size the digital object to the glyphs. These techniques are limited by accuracy of a user in providing the inputs, expense of obtaining these inputs from the user, and user accuracy in sizing and placing the digital object. Although subsequent conventional techniques have been developed for snapping a digital object to snapping lines, these techniques rely on snapping lines that are generated based on edges of a text box containing the glyphs or manually generating guide lines. As described above, these conventional techniques are still limited by accuracy of a user in providing the inputs, expense of obtaining these inputs from the user, and user accuracy in placing the manually generated guide lines. As such, these conventional techniques are often frustrating and fail for their intended purpose.

Techniques and systems are described to improve the computer-related technology of snapping line generation. In one example, techniques are employed by a computing device to aid a user in combining a digital object with glyphs. A user, for instance, may choose to place a shape adjacent to text characters when creating digital content such as a logo, webpage, slideshow presentation, pamphlet, journal article, and so forth. For example, a user designing a logo may provide a text portion of the logo and then wish to add a shape adjacent to the text portion of the logo that is cohesive with the size of the text portion in a user interface. Thus, inclusion of a snapping line in a user interface that is based on the glyphs of the text portion of the logo may assist the user to accurately, quickly, and simply size the shape for cohesiveness with the text portion.

To do so in this example, glyph bounding boxes corresponding to the glyphs within the text portion are analyzed to determine coordinates (such as y=b) of top and bottom edges of the glyph bounding boxes. The coordinates are used to generate bounding box lines that are collinear with, or define, top or bottom edges of glyph bounding boxes. Duplicate bounding box lines are then merged to create a data set of candidate snapping lines. The data set includes candidate snapping line information for each of the candidate snapping lines such as a coordinate of the candidate snapping line. The candidate snapping line information also includes an indication of a significance of the candidate snapping line that is based, at least in part, on a total quantity of glyphs, a maximum quantity of consecutive glyphs, a total length of glyphs, or a total length of consecutive glyphs having a bounding box collinear with, defined by, or represented by the candidate snapping line.

The candidate snapping lines are then decluttered by removing candidate snapping lines that are within a threshold distance of another candidate snapping line that has a relatively greater amount of significance as indicated by the candidate snapping line information. For example, take a first candidate snapping line that is collinear with edges of three bounding boxes and a second candidate snapping line that is collinear with edges of four bounding boxes. If the first candidate snapping line is within a threshold distance of the second candidate snapping line, the first candidate snapping line is removed based on the second candidate snapping line having a relatively greater amount of significance than the first candidate snapping line.

Snapping lines are then generated by the computing device based on the remaining candidate snapping lines. The snapping lines are defined in the user interface as operable to allow the user to snap an edge of the shape to the snapping line by moving the edge into proximity of the snapping line. The user is then able to simply, quickly, and accurately combine text characters with digital objects in a visually cohesive way as part of creating digital content. Further discussion of these and other examples are included in the follow sections.

Terms

"Snapping line" refers to a line that is defined in a user interface to cause an edge of a digital object of another element that is within a threshold distance to the snapping line to be repositioned to coincide with the snapping line. In an example implementation of a snapping line, a user may resize a digital object by dragging an edge of the object. If the user drags the edge (e.g., moves or resizes) within a threshold distance of a snapping line that is parallel to the edge, the digital object is repositioned and thus will "snap" such that the edge is positioned collinearly with the snapping line. The threshold distance may be defined in a variety of ways, such as a defined quantity of pixels (e.g., by a user or preconfigured setting to specify a number of pixel such as five), a relative distance between the digital object and the snapping line and a distance between the digital object and another digital object, and so forth.

"Glyph" refers to a text character. A glyph may be a character in any language or alphabet and may be oriented in any direction.

"Bounding box" refers to a parallelogram, visible or invisible in a user interface, that circumscribes a glyph. A bounding box has a top, a bottom, a left, and a right edge.

"Bounding box line" refers to a line that extends collinearly from, or defines, a bounding box edge. A bounding box line may be identified in function form such as y=b or x=c. Although, for brevity, reference is made throughout this specification to bounding box lines extending collinearly from a top or a bottom edge of a bounding box, bounding box lines may also extend collinearly, and vertically, from a left and a right edge of a bounding box. These vertical bounding box lines may be particularly useful when glyphs are vertically oriented.

"Candidate snapping line" refers to a line representing, and collinear with, one or more collinear bounding box lines. A candidate snapping line may be selected to serve as a basis for defining a snapping line for generation in a user interface.

"Significance" refers to an assessment of a factor or factors that determine the visual prominence of a candidate snapping line. In some implementations, significance of a candidate snapping line is based on candidate snapping line information, which may include a quantity of glyphs having represented collinear bounding box lines, a ratio of glyphs having represented collinear bounding box lines to a total quantity of glyphs, a quantity of consecutive glyphs having represented collinear bounding box lines, a ratio of consecutive glyphs having represented collinear bounding box lines to a total quantity of glyphs, a total length of glyphs having represented collinear bounding box lines, a ratio of a total length of glyphs having represented collinear bounding box lines to a total length of all of the glyphs, or representing a top-most or bottom-most bounding box line. A candidate snapping line is hereinafter referred to as significant if its significance value meets or exceeds a significance threshold, which may then be used to determine whether a candidate snapping line is selected to serve as a basis for generating a snapping line. A relative significance value of a candidate snapping line is the value of the candidate snapping line considered against the significance value of at least one other candidate snapping line.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital media environment 100 in an example implementation that is operable to employ snapping line generation techniques described herein. The illustrated environment 100 includes a computing device 102 configured for use in snapping line generation.

The computing device 102 may be configured in a variety of different ways. For example, the computing device 102 may be configured as a desktop computer, a laptop computer, a television, a mobile device (e.g., assuming a handheld configuration such as a tablet or mobile phone), a tablet, a digital camera, and so forth. Additionally, although a single computing device 102 is shown, the computing device 102 may be representative of a plurality of different devices to perform operations "over the cloud" as further described in relation to FIG. 7.

The computing device 102 is illustrated as having a processing system 104 that includes one or more processing devices and computer-readable media 106 (illustrated as "Media"). The processing system 104 includes an operating system 108 for managing system resources and accessing the computer-readable media 106. The computer-readable media 106 includes an image processing module 110 having a snapping line generation module 112 that is operable via the processing system 104 to implement corresponding functionality described herein.

The snapping line generation module 112 is configured to generate snapping lines 114 based on characteristics of glyphs 116 in a user interface 118 automatically and without user intervention. The snapping lines 114 are output in the user interface 118 operable to cause an edge of a digital object to move, or snap, to the snapping line in response to an input to move the edge into proximity of the snapping line. For example, a user may utilize I/O interfaces to move or resize a digital object such that an edge of the digital object is near a snapping line. In response to such moving or resizing, the edge of the digital object is snapped to the snapping line. Further discussion of these and other examples are included in the follow sections.

This constitutes an improvement over conventional approaches which configure snapping lines based on the text box (text container) or require a user to manually generate snapping lines around characteristics of glyphs. The automated nature of the described implementations provides a fast, efficient, and adaptable solution, as discussed below in more detail.

Figure 2:
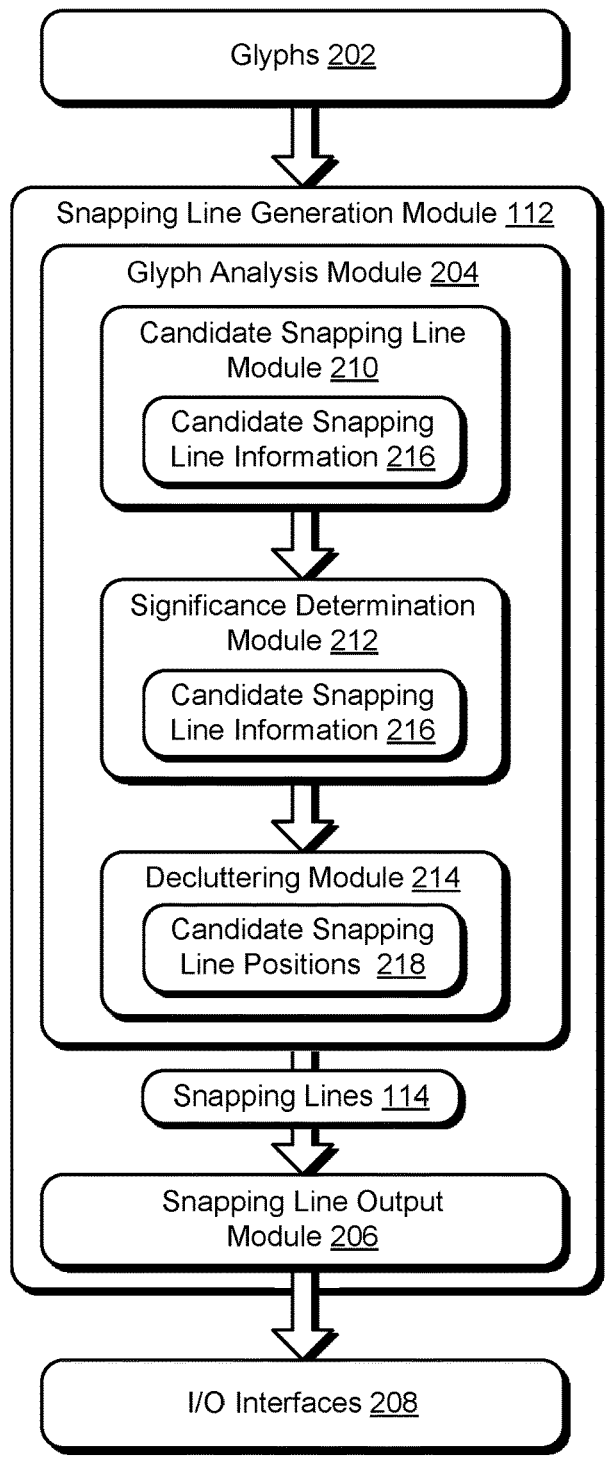
FIG. 2 depicts a system in an example implementation showing the computing device of FIG. 1 in greater detail.
Figure 3:
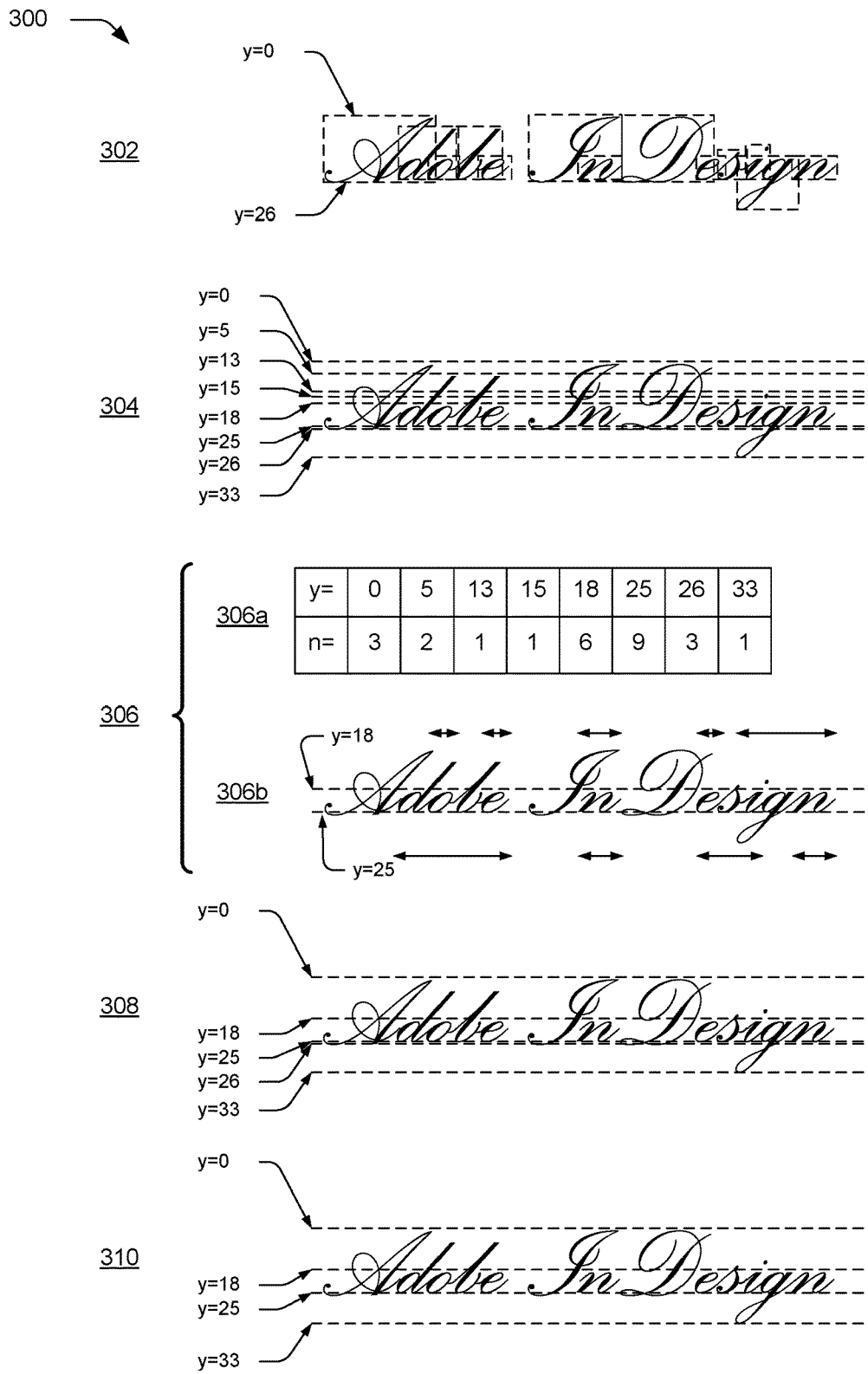
FIG. 3 is a procedure in an example implementation in which a snapping line generation technique is used to provide a user interface with generated snapping lines based on glyphs.
Figure 4:
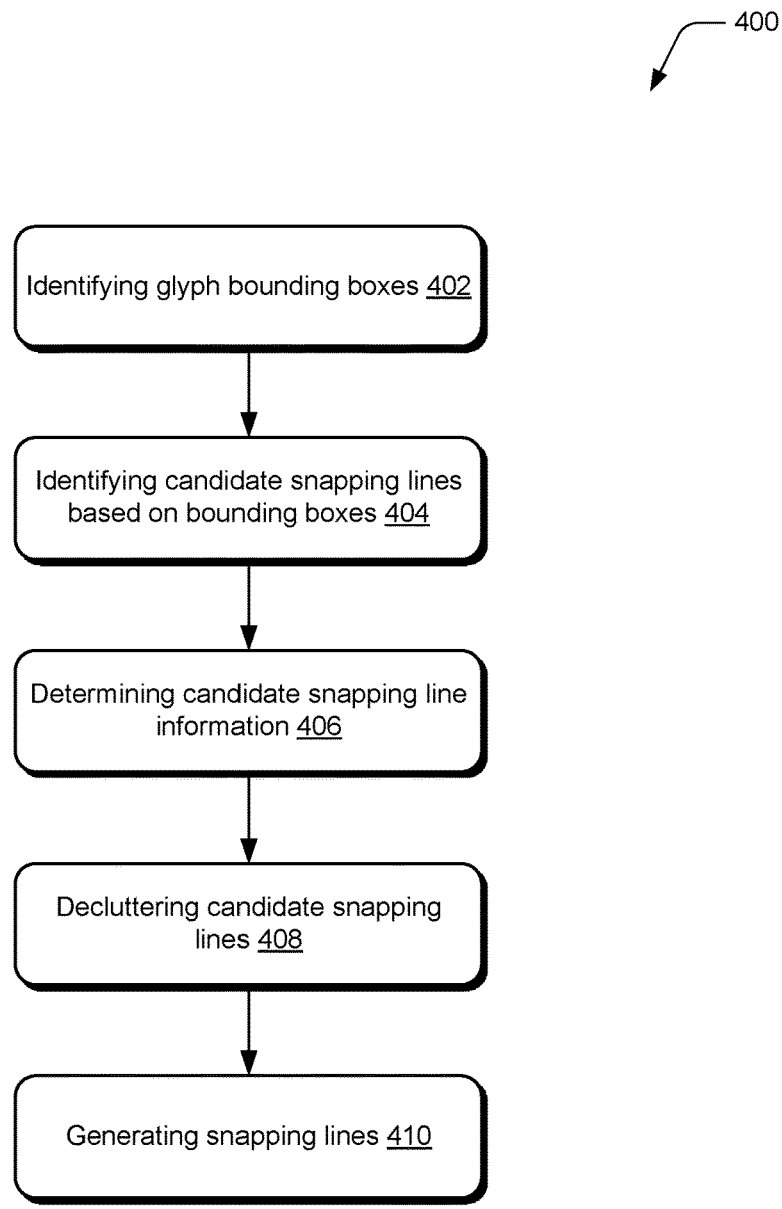
FIG. 4 is a flow diagram depicting a procedure in an example implementation in which a snapping line generation technique is used that includes generating a snapping line based on identified collinearity of bounding box lines.

FIG. 2 illustrates an example implementation showing operation of the snapping line generation module 112 of FIG. 1 in greater detail. FIG. 3 depicts a procedure 300 having stages 302-310 in an example implementation of snapping line generation based on glyphs in accordance with one or more example implementations. FIG. 4 depicts a procedure 400 in an example implementation having operations 402-410 in which snapping lines are generated that are usable to reposition items within a user interface. In the following discussion, reference is made interchangeably to FIGS. 2-4.

In the example implementation, the snapping line generation module 112 includes a glyph analysis module 204 and a snapping line output module 206. As illustrated, glyphs 202 from a user interface of a computing device, such as computing device 102 of FIG. 1, are analyzed by glyph analysis module 204. The glyphs 202 to be analyzed may be a full set of glyphs in a text box, or may be a subset of glyphs in a text box. The subset of glyphs may be determined based on user input to select the subset, or by an algorithm selecting the subset based on positions of the glyphs within a text box. For example, the algorithm may select glyphs that are within a quantity of characters from an end of the text box. Alternatively or additionally, the algorithm may select glyphs that are first characters in words.

The subset of glyphs may be, for instance, determined by a position of a cursor. For example, the subset of glyphs may be one or more of a glyph, a word, or a glyph line where the cursor is present.

The glyph analysis module 204 includes a candidate snapping line module 210, a significance determination module 212, and a decluttering module 214. The candidate snapping line module 210 is operable to analyze the glyphs 202 to determine candidate snapping line information 216. To determine candidate snapping line information 216, the candidate snapping line module 210 is configured to first identify a bounding box for the glyphs (operation 402). The bounding boxes are then analyzed to identify a pair of bounding box lines for each analyzed glyph in function form such as y=b or x=c. As shown at stage 302, for instance, bounding boxes are identified for each glyph in the words "Adobe InDesign." A bounding box for the first glyph, A, is analyzed to identify bounding box lines y=0 and y=26.

The candidate snapping line module 210 is also operable to analyze bounding box lines to identify which of the plurality of bounding box lines are collinear, one with another. In some implementations, the candidate snapping line module 210 uses the identification of the bounding box lines in function form to generate a set of candidate snapping lines to represent collinear bounding box lines (operation 404). For example, at stage 304, candidate snapping lines are identified in function form based on the pair of bounding box lines of the glyphs, as identified at stage 302. The candidate snapping line module 210 may merge collinear, or duplicate, bounding box lines to create a data set of candidate snapping lines to represent the collinear bounding box lines. As illustrated in stage 304, the candidate snapping lines are identified in function form as y=0; y=5; y=13; y=15; y=18; y=25; y=26; and y=33.

The candidate snapping line module 210 may also determine the candidate snapping line information 216 for each candidate snapping line (operation 406). The snapping line information 216 may include a height or width position of the candidate snapping line, a quantity of glyphs having a bounding box line represented by the candidate snapping line, a maximum quantity of consecutive glyphs having a bounding box line represented by the candidate snapping line, and a length of all glyphs having a bounding box line represented by the candidate snapping line. Stage 306 illustrates a determination of two components of snapping line information by the candidate snapping line module 210. As shown in stage 306a, a quantity (n) of glyphs having a bounding box line represented by each candidate snapping line is determined by the candidate snapping line module 210. For example, candidate snapping line y=0 represents a bounding box line of three glyphs, candidate snapping line y=5 represents a bounding box line of two glyphs, etc. As shown in stage 306b, lengths of glyphs having bounding box lines represented by candidate snapping lines are measured. In the illustrated example, candidate snapping lines y=18; and y=25 are analyzed to determine a length of glyphs having bounding box lines represented by candidate snapping lines. The candidate snapping line identified as y=18 represents bounding box lines of glyphs "o," "e," "n," "e," "g," and "n" and the candidate snapping line identified as y=25 represents bounding box lines of glyphs "d," "o," "b," "e," "n," "e," "s," "i," and "n."

Returning again to FIG. 2, the significance determination module 212 is configured to determine a significance of the candidate snapping lines identified by the candidate snapping line module 210 to select candidate snapping lines that are to serve as a basis for generating snapping lines ("generated snapping lines") by the snapping line output module 206. Significance of the candidate snapping lines is determined based on the candidate snapping line information 216, such as a total quantity of glyphs, a maximum quantity of consecutive glyphs, a total length of glyphs, or a total length of consecutive glyphs having a bounding box collinear with, defined by, or represented by the candidate snapping line. In some implementations, the significance determination module 212 may compare candidate snapping line information against a significance threshold. For example, take candidate snapping line y=25 of FIG. 3 that represents bounding boxes of nine total glyphs, four consecutive glyphs, and a total length of all glyphs having represented collinear bounding box lines is about 50% of the total length of analyzed glyphs. The identified glyphs include thirteen total glyphs, so the nine total glyphs represented by candidate snapping line y=25 can be converted to a fraction of 9/13 total glyphs or about 69% of total glyphs. Similarly, the four consecutive glyphs represented by candidate snapping line y=25 can be converted to a fraction of 4/13 total glyphs or about 31% of total glyphs.

The values of total represented glyphs, consecutive glyphs, and length of represented glyphs (69%, 31%, 50%) are then compared against significance threshold values to determine if the example candidate snapping line is to be selected for generating a snapping line in the user interface. The example candidate snapping line may be selected if at least one value meets a corresponding threshold value, or alternatively, if a minimum quantity or ratio of values meet corresponding threshold values. One or more threshold values may be modified by user input, including other thresholds discussed herein including, but not limited to, threshold lengths, threshold quantities, threshold percentages, and distance thresholds. A distance threshold may be adjusted by, for example, zooming in or zooming out to increase or decrease a quantity of pixels, or displayed distance, between two objects.

The values (69%, 31%, 50%) may be compared with values of other candidate snapping lines to determine a relative significance order of the candidate snapping lines. In comparing relative significance, values may be compared directly, or some values may be weighted to be more or less influential, such as a maximum quantity of consecutive glyphs having represented collinear bounding box lines. In some implementations, a minimum or maximum quantity of candidate snapping lines may be selected for producing snapping lines. For example, if a minimum quantity is three, the three relatively most significant candidate snapping lines are selected for producing snapping lines.

Although the example implementation uses values based on percentages the values may reflect quantities of glyphs or measurements of a length of glyphs rather than percentages of glyphs or percentages of a total length of glyphs.

As illustrated at stage 308, snapping lines are generated based on significance of the candidate snapping lines based on the snapping line information determined at stage 306. As depicted, candidate snapping lines y=0; y=18; y=25; y=26 and y=33 have been determined to be sufficiently significant for use in the user interface for different reasons. Candidate snapping line y=0, for instance, is determined to be significant because, for example, it is the upper-most candidate snapping line or because three glyphs have bounding box edges collinear with the candidate snapping line, thus meeting a threshold quantity. Candidate snapping line y=18 has been determined to be significant because, for example a total length of glyphs having collinear bounding box edges meet a threshold length or meet a threshold percentage of total glyph length for significance. Candidate snapping line y=25 has been determined as significant because four consecutive glyphs have a bounding box edge collinear with the candidate snapping line, thus meeting a threshold quantity, or because it is the baseline of the text. Candidate snapping line y=26 has been determined as significant because three glyphs have bounding box edges that are collinear with the candidate snapping line, thus meeting a threshold quantity. Candidate snapping line y=33 has been determined to be significant because it is the lower-most candidate snapping line.

The candidate snapping lines that are determined to be sufficiently significant are then decluttered by the decluttering module 214 (operation 408). The decluttering module 214 is configured to remove candidate snapping lines based on candidate snapping line positions 218. For example, candidate snapping line positions 218 may be analyzed by the decluttering module 214 to determine proximity of a corresponding baseline of the selected candidate snapping line to another baseline of glyphs (InterTolerance). If a text box includes glyphs on three distinct baselines (three lines of text), for instance, a distance between baselines may be determined. If a baseline is determined to be a distance from another baseline having relatively greater significance such that the distance is less than an InterTolerance threshold, the baseline and/or all candidate snapping lines identified from glyphs on the baseline are filtered out.

If the distance from a baseline having relatively greater significance is more than the tolerance threshold, the decluttering module 214 analyzes selected candidate snapping lines for IntraTolerance based on candidate snapping line positions 218. In a decluttering based on IntraTolerance analysis, the decluttering module 214 removes selected candidate snapping lines that are within an IntraTolerance threshold of another candidate snapping line having relatively greater significance.

Beginning at stage 308, for example, significant candidate snapping lines y=0; y=18; y=25; y=26 and y=33 are analyzed for decluttering. In the illustrated example, candidate snapping lines y=25 and y=26 are within an IntraTolerance threshold distance of each other. Also in this example, based on the candidate snapping line information, candidate snapping line y=25 is more significant, relatively, than candidate snapping line y=26, and therefore candidate snapping line y=26 is removed by the decluttering module 214.

After decluttering based on IntraTolerance analysis, the glyph analysis module 204 generates snapping lines 114 from the remaining candidate snapping lines, and/or based on significance of the candidate snapping lines, for delivery to the snapping line output module 206 (operation 410). As shown at stage 310, candidate snapping lines y=0; y=18; y=25 and y=33 are generated based on decluttering the significant candidate snapping lines. The snapping line output module 206 is operable to output the snapping lines 114 into the I/O interfaces 208 to assist a user to cohesively combine the digital object with the glyphs 202 from which the snapping lines are generated.

Snapping line output module 206, for example may generate the snapping lines based on a determination of significance of the candidate snapping lines by significance determination module 212.

Use of Generated Snapping Lines

Figure 5:
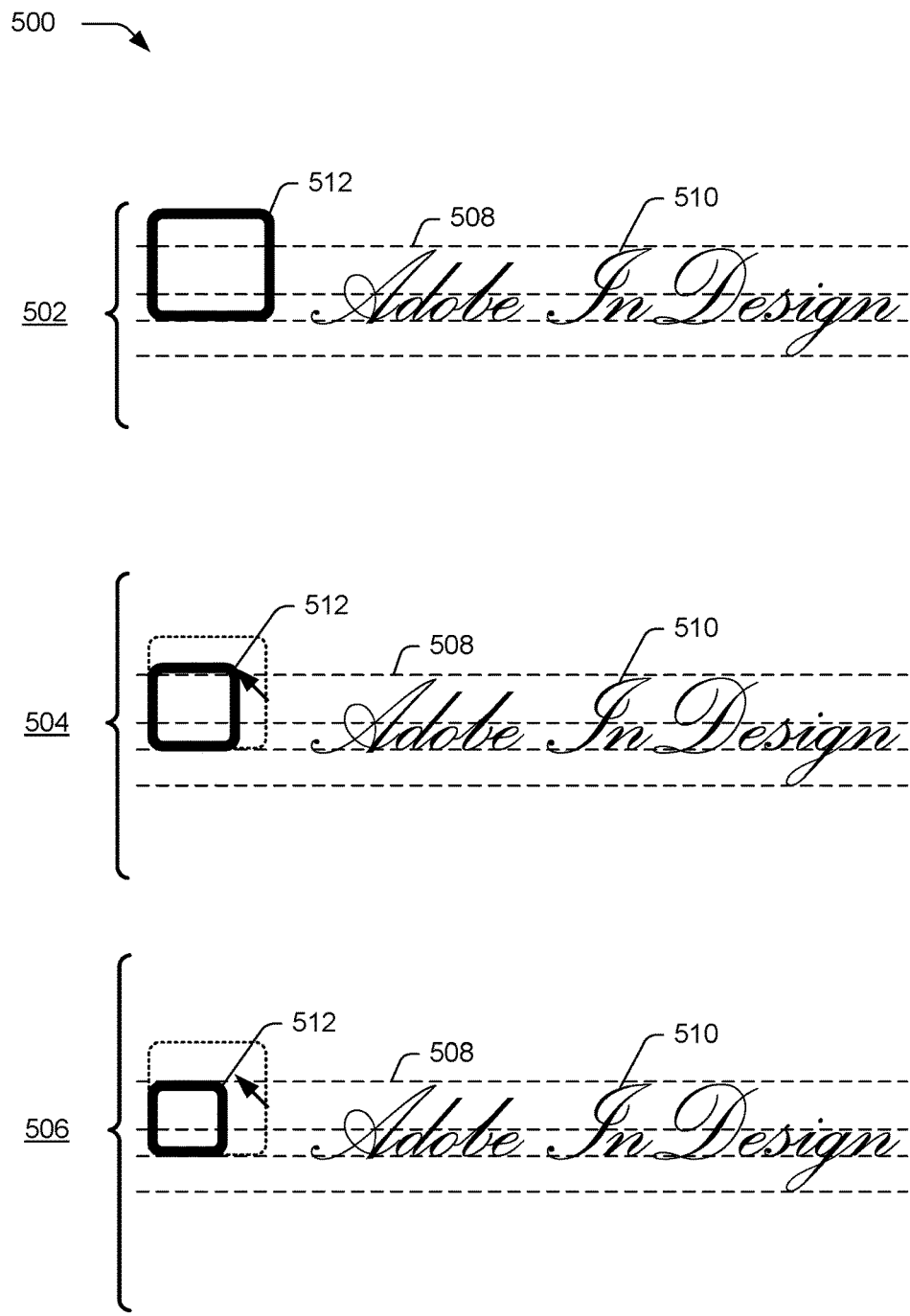
FIG. 5 is a flow diagram depicting a procedure in an example implementation in which a snapping line generation technique is used that includes parameters for generating at least one snapping line.
Figure 6:
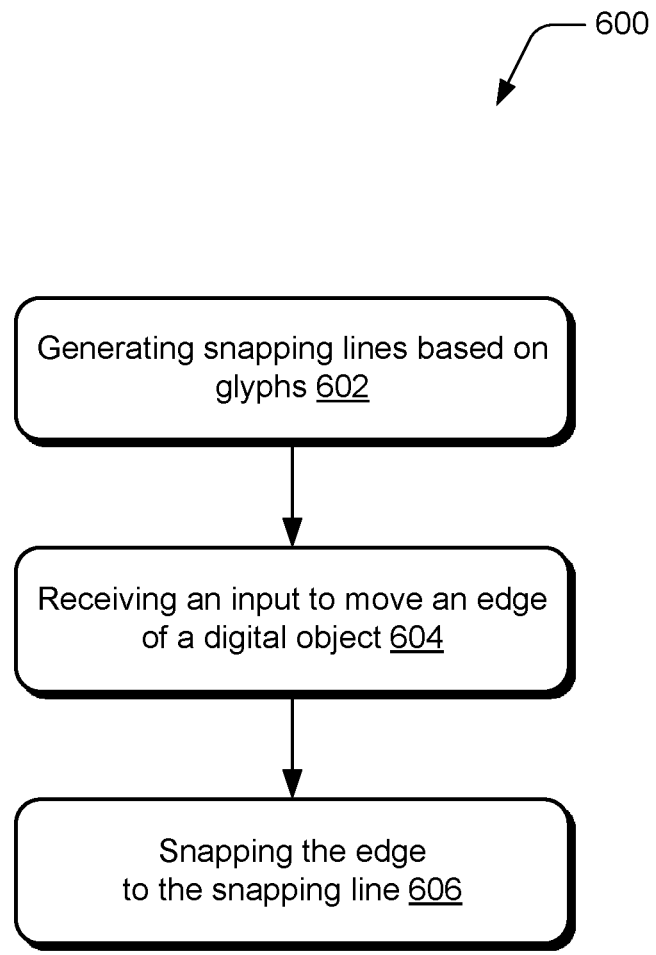
FIG. 6 is a procedure in an example implementation in which snapping lines are generated based on glyphs and then used to facilitate snapping of an edge of a digital object for visual cohesiveness with the glyphs.

FIG. 5 illustrates an example procedure 500 having stages 502-510 in an example implementation for use of the snapping lines generated based on glyphs as described with respect to FIGS. 2-4. FIG. 6 depicts a procedure 600 in an example implementation having operations 602-606 for use of the snapping lines generated based on glyphs as described with respect to FIGS. 2-4. In the following discussion, reference is made interchangeably to FIGS. 2, 5, and 6.

At discussed above with respect to FIGS. 2-4, snapping lines are generated based on glyphs to facilitates combining glyphs and digital objects in a visually cohesive way (operation 602). For example, at stage 502 of example procedure 500, snapping line generation module 112 generates the four illustrated snapping lines 508 based on the glyphs 510 contained in the words "Adobe InDesign."

To utilize one of the snapping lines, input is received to move an edge of a digital object into proximity of a snapping line (operation 604). The input may be one or more of moving the object, resizing the object, or rotating the object. The input is received, for example, by I/O interfaces 208 of computing device 102. As shown at stage 504 of the example procedure 500, a resizing input is received to move a corner and two edges of the digital object 512 into proximity of one of the snapping lines 508.

Once an edge of the digital object is in proximity of the snapping line, the edge is snapped, or "magnetically" attached, to the snapping line without an additional input from a user (operation 606). For example, image processing module 110 automatically snaps the edge of the digital object to the snapping line based on the edge being within a threshold distance from the snapping line. As illustrated at stage 506, without receiving additional input from a user, the top-most edge and top-right corner of the digital object 512 are snapped to the top-most of the snapping lines 508. As illustrated, the digital object 512 is thus resized for visual cohesiveness with the glyphs 510.

Example System and Device

Figure 7:
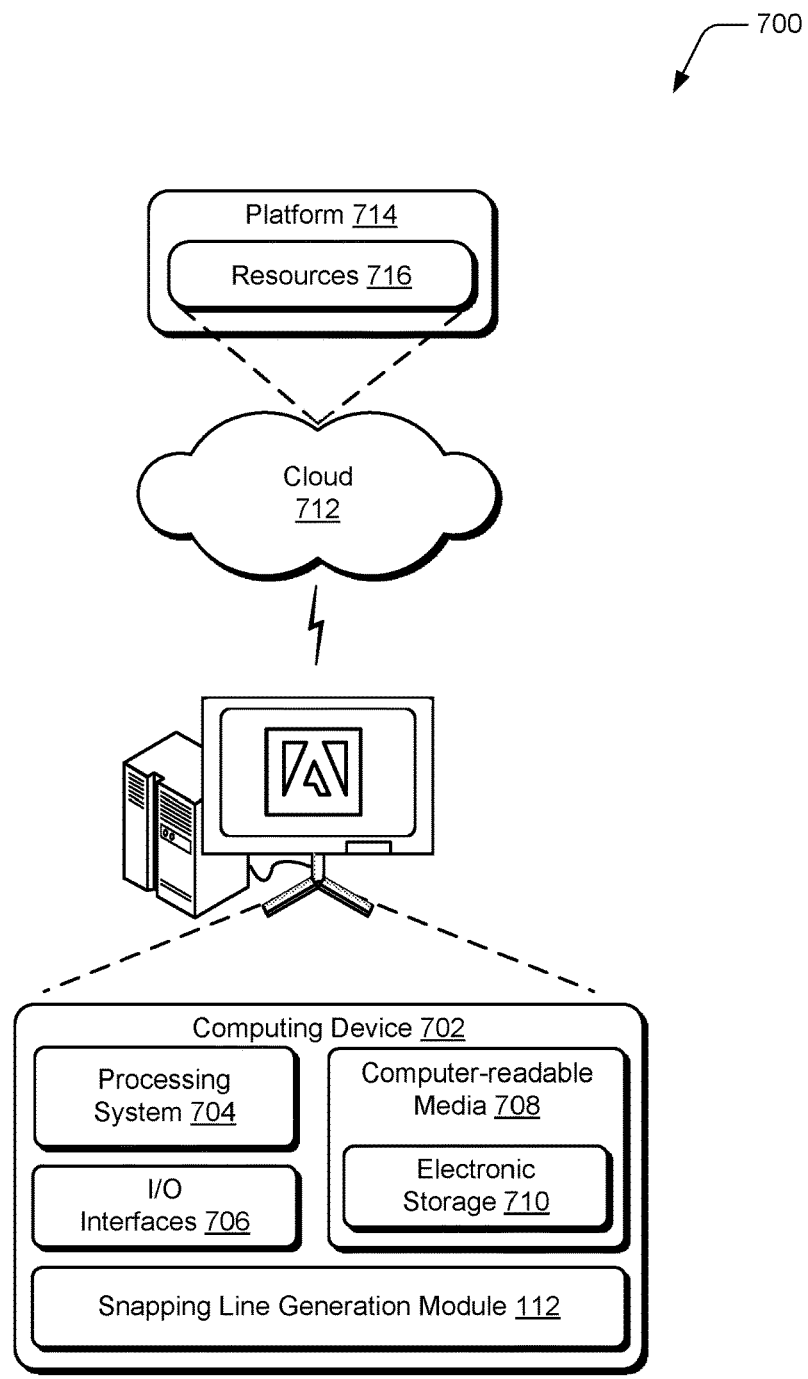
FIG. 7 illustrates an example system including various components of an example device that can be implemented as any type of computing device as described and/or utilize with reference to FIGS. 1-6 to implement implementations of the techniques described herein.

FIG. 7 illustrates an example system generally at 700 that includes an example computing device 702 that is representative of one or more computing systems and/or devices that may implement the various techniques described herein. This is illustrated through inclusion of the snapping line generation module 112. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 708, and one or more I/O interfaces 706 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 may be implemented, at least in part, in hardware elements that may be configured as processors, functional blocks, and so forth. This may include implementation in hardware as an application specific integrated circuit or other logic device formed using one or more semiconductors. The hardware elements are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 708 is illustrated as including electronic storage 710. Electronic storage represents memory/storage capacity associated with one or more computer-readable media. Electronic storage 710 may include volatile media (such as random access memory (RAM)) and/or nonvolatile media (such as read only memory (ROM), Flash memory, optical disks, magnetic disks, and so forth). Electronic storage 710 may include fixed media (e.g., RAM, ROM, a fixed hard drive, and so on) as well as removable media (e.g., Flash memory, a removable hard drive, an optical disc, and so forth). Computer-readable media 708 may be configured in a variety of other ways as further described below.

Input/output interface(s) 706 are representative of functionality to allow a user to enter commands and information to computing device 702, and also allow information to be presented to the user and/or other components or devices using various input/output devices. Examples of input devices include a keyboard, a cursor control device (e.g., a mouse), touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), a network card, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media 708 may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, computer-readable media 708 and other hardware elements are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 712 via a platform 714 as described below.

The cloud 712 includes and/or is representative of the platform 714 for resources 716. The platform 714 abstracts underlying functionality of hardware (e.g., servers) and software resources 716 of the cloud 712. Resources 716 may include applications and/or data that can be utilized while computer processing is executed on servers that are remote from the computing device 702. Resources 716 can also include services provided over the Internet and/or through a subscriber network, such as a cellular or Wi-Fi network.

The platform 714 may abstract resources and functions to connect the computing device 702 with other computing devices. The platform 714 may also serve to abstract scaling of resources to provide a corresponding level of scale to encountered demand for resources 716 that are implemented via the platform 714. Accordingly, in an interconnected device implementation, implementation of functionality described herein may be distributed throughout the system 700. For example, the functionality may be implemented in part on the computing device 702 as well as via the platform 714 that abstracts the functionality of the cloud 712.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate snapping lines around glyphs, a method implemented by at least one computing device, the method comprising:
   locating, by the at least one computing device, a plurality of bounding box lines from a plurality of glyph bounding boxes, each said glyph bounding box corresponding to a glyph for output in a user interface;
   identifying, by the at least one computing device, a bounding box line of the plurality of bounding box lines as being collinear with another bounding box line of the plurality of bounding box lines;
   generating, by the at least one computing device, a snapping line based at least in part on the bounding box line that is collinear with the another bounding box line; and
   outputting, by the at least one computing device, the snapping line in the user interface, the snapping line operable to cause an edge of a digital object to move to the snapping line in response to input moving the edge into proximity of the snapping line in the user interface.

2. A method as recited in claim 1, wherein the generating is based at least in part on a quantity of the plurality of bounding box lines that are collinear as meeting a threshold quantity for generating the snapping line.

3. A method as recited in claim 2, further comprising receiving, by the at least one computing device, a user input to modify the threshold quantity.

4. A method as recited in claim 1, wherein the generating is based at least in part on a ratio of the plurality of glyph bounding boxes having bounding box lines of the plurality of bounding box lines that are collinear to a total quantity of the plurality of glyph bounding boxes.

5. A method as recited in claim 1, wherein the generating is based at least in part on a quantity of the plurality of bounding box lines that are collinear that are located from consecutive glyph bounding boxes of the plurality of glyph bounding boxes.

6. A method as recited in claim 1, wherein the generating is based at least in part on a total length of the plurality of glyph bounding boxes having bounding box lines that are collinear and meet a threshold length for generating the snapping line.

7. A method as recited in claim 1, wherein the generating is based at least in part on a ratio of a total length of the plurality of glyph bounding boxes having bounding box lines that are collinear to a total length of the plurality of glyph bounding boxes.

8. A method as recited in claim 1, further comprising generating, by the at least one computing device, at least one additional snapping line based on a bounding box line of the plurality of bounding box lines as being one of an upper-most or a lower-most bounding box line.

9. A method as recited in claim 1, wherein the generating is based at least in part on a distance threshold.

10. A method as recited in claim 9, further comprising receiving input to modify the distance threshold.

11. A computing device comprising:
   a processing system; and
   a computer readable storage medium having stored thereon instructions that implement a platform of the computing device that, responsive to execution by the processor, cause the processor to perform operations comprising:
      locating a plurality of bounding box lines from a plurality of glyph bounding boxes, each said glyph bounding box corresponding to a glyph for output in a user interface;
      identifying a bounding box line from the plurality of bounding box lines as being collinear with another bounding box line of the plurality of bounding box lines;
      generating a snapping line based at least in part on the bounding box line that is collinear with the another bounding box line; and
      outputting the snapping line in the user interface, the snapping line operable to cause an edge of a digital object to move to the snapping line in response to input moving the edge of the digital object into proximity of the snapping line in the user interface.

12. A computing device as recited in claim 11, the operations further comprising receiving a user input to select a subset of glyphs in a text box corresponding to the plurality of glyph bounding boxes.

13. A computing device as recited in claim 11, wherein the generating is based in part on a length of consecutive glyph bounding boxes of the plurality of glyph bounding boxes.

14. A computing device as recited in claim 11, the operations further comprising repeating one or more of the locating, the identifying, the generating, or the outputting in response to receiving an input to remove a glyph, modify a glyph, or add a glyph corresponding to a glyph bounding box of the plurality of glyph bounding boxes.

15. A computing device as recited in claim 14, wherein the input to modify the glyph comprises one or more of modifying a font style of the glyph or changing a language of the glyph.

16. In a digital medium environment to generate snapping lines around glyphs, a method comprising:
   steps for locating a plurality of bounding box lines in a user interface, each said bounding box line based on an edge of a glyph bounding box;
   steps for identifying a first candidate snapping line representing a first quantity of the plurality of bounding box lines that are collinear, one to another;
   steps for identifying a second candidate snapping line representing a second quantity of the plurality of bounding box lines that are collinear, one to another;
   steps for generating a snapping line based at least in part on the first candidate snapping line being beyond a threshold distance from the second candidate snapping line, the second quantity of bounding box lines being greater than the first quantity of bounding box lines; and
   steps for outputting the snapping line based on the first candidate snapping line in the user interface, the snapping line operable to cause an edge of a digital object to move to the snapping line in response to input moving the edge into proximity of the snapping line in the user interface.

17. A method as recited in claim 16, further comprising steps for receiving input to modify the threshold distance.

18. A method as recited in claim 17, wherein the input comprises zooming in on the first candidate snapping line.

19. A method as recited in claim 16, wherein the plurality of bounding box lines is oriented vertically.

20. A method as recited in claim 16, wherein each said bounding box line is based on glyph bounding boxes corresponding to a subset of glyphs based on one or more of a glyph, a word, or a glyph line where a cursor present.

\* \* \* \* \*